(12) United States Patent
Davison et al.

(10) Patent No.: US 11,745,321 B2
(45) Date of Patent: *Sep. 5, 2023

(54) APPARATUS FOR ASSISTED BUCKLE RELEASE

(71) Applicant: B&B Solutions, LLC, Houston, TX (US)

(72) Inventors: Rebecca Davison, Houston, TX (US); Barbara Heilman, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,158

(22) Filed: Oct. 19, 2022

(65) Prior Publication Data
US 2023/0042597 A1    Feb. 9, 2023

Related U.S. Application Data

(63) Continuation of application No. 17/696,987, filed on Mar. 17, 2022, now Pat. No. 11,498,192, which is a continuation of application No. 17/237,231, filed on Apr. 22, 2021, now Pat. No. 11,389,938, which is a continuation-in-part of application No. 16/675,305, filed on Nov. 6, 2019, now Pat. No. 10,994,396, which is a continuation-in-part of application No. 16/278,021, filed on Feb. 15, 2019, now Pat. No. 10,500,702, which is a continuation of application No. 15/699,198, filed on Sep. 8, 2017, now Pat. No. 10,213,910.

(60) Provisional application No. 62/394,080, filed on Sep. 13, 2016.

(51) Int. Cl.
*B25B 27/00*     (2006.01)
*B25G 1/10*     (2006.01)
*B60N 2/28*     (2006.01)
*A44B 11/25*     (2006.01)
*B60R 22/10*     (2006.01)

(52) U.S. Cl.
CPC ...... *B25B 27/0035* (2013.01); *A44B 11/2546* (2013.01); *B25G 1/102* (2013.01); *B60N 2/2812* (2013.01); *B60N 2002/2815* (2013.01); *B60R 22/105* (2013.01)

(58) Field of Classification Search
CPC . B25B 27/0035; B25G 1/102; A44B 11/2546; B60N 2/2812; B60N 2002/2815; B60R 22/105
USPC ........................................................ 81/15.9
See application file for complete search history.

(56) References Cited

U.S. PATENT DOCUMENTS

| | | | |
|---|---|---|---|
| 8,484,785 B1 * | 7/2013 | Kristiansen ............ | B67B 7/403 7/152 |
| 8,869,407 B2 * | 10/2014 | Votolato .................... | B67B 7/30 30/294 |
| 10,791,801 B2 * | 10/2020 | Lambarth ........... | B25B 27/0035 |
| 10,806,221 B2 * | 10/2020 | Ritchie .................. | B60R 22/48 |
| 2005/0076742 A1 * | 4/2005 | Yurek, Jr. ................ | B67B 7/24 81/3.55 |
| 2011/0308057 A1 * | 12/2011 | Abrams .................... | B25B 7/02 29/270 |

(Continued)

*Primary Examiner* — Hadi Shakeri
(74) *Attorney, Agent, or Firm* — Williams Intellectual Property; Benjamin F. Williams

(57) ABSTRACT

An apparatus for assisted buckle release employing a generally C-shaped, V-shaped, or U-shaped assistive device adapted to depress a buckle's release button, such as a button typical of a child car seat restraint harness, and thereby assist in unlocking the buckle.

6 Claims, 13 Drawing Sheets

(56) References Cited

U.S. PATENT DOCUMENTS

2016/0166014 A1* 6/2016 Soenen .............. A44B 11/2526
                                                        24/639
2018/0132571 A1* 5/2018 Lambarth .......... A44B 11/2526

* cited by examiner

APPARATUS FOR ASSISTED BUCKLE RELEASE

CROSS-REFERENCE TO RELATED APPLICATIONS

This continuing application claims the benefit of continuing application Ser. No. 17/696,987 filed on 17 Mar. 2022, which claimed the benefit of continuing application Ser. No. 17/237,231 filed on 22 Apr. 2021, which claimed the benefit of continuation-in-part application Ser. No. 16/675,305, filed on 6 Nov. 2019, which claimed the benefit of continuation-in-part application Ser. No. 16/278,021, filed on 15 Feb. 2019, which in turn claims the benefit of nonprovisional application Ser. No. 15/699,198, filed on 8 Sep. 2017.

FEDERALLY SPONSORED RESEARCH OR DEVELOPMENT

Not Applicable

INCORPORATION BY REFERENCE OF MATERIAL SUBMITTED ON A COMPACT DISK

Not Applicable

SPECIFICATION

To all Whom it May Concern

Be it known that we, Rebecca Davison and Barbara Heilman, citizens of the United States, have invented new and useful improvements in an apparatus for assisted buckle release as described in this specification.

FIELD OF THE INVENTION

The present invention relates in general to the field of occupant restraint systems and more particularly, but not by way of limitation to an apparatus that assists with the depression of actuator buttons on restraint harnesses to facilitate release of the buckle.

BACKGROUND OF THE INVENTION

Occupant restraint systems are well known. They typically have a first piece of belting having a buckle at one end and an opposite end is anchored in place. The anchoring may be either by direct fastening or via a device such as a retractor. A tongue is attached to a free end of a second piece of belting whose opposite end is also anchored. When the restraint system is in use to restrain a seated occupant, the two pieces of belting are connected by inserting the tongue of the second piece of belting into the buckle of the first piece of belting and adjusting the restraint around the occupant.

The buckle comprises a casing which contains a spring-loaded latching mechanism for releasably latching the buckle to the tongue. A typical buckle casing comprises an aperture which exposes an actuating button for depression by a person's thumb or fingertip to cause the latching mechanism to release the buckle from the latched condition. In today's typical buckle, the area of the actuating button, which is exposed by the aperture, approximates that of the thumb or fingertip. The actuating button surface against which the thumb or fingertip presses is generally flush with the surface of the casing containing the aperture. Oftentimes, a smaller version of this same type of buckle and actuating button assembly is used in child restraint seats designed to secure an occupant, such as a baby or child, in place. The actuating button assembly installed in child restraint seats is regulated by the Federal Motor Vehicle Safety Standards (FMVSS), which recommends a minimum required release force to depress the actuating button of 40 N (Newton) or 9.0 lbf (pound-force).

For any number of various reasons, a person may be impaired from depressing the actuating button with this amount of force and, thus, unable to unlatch a child restraint seat buckle of this type. For instance, caregivers may have arthritis in their hands, which impacts the strength with which they can apply pressure in their thumbs to sufficiently depress the actuator button with the required force to release the buckle and remove the child from the car seat. With the increase in the number of grandparent caregivers, the lack of required thumb or finger strength presents a significant problem for the convenience of mobility in an automotive vehicle while caring for a young child. Further, the situation poses risks to child safety if the caregiver does not properly buckle the child to thereby make it easier for the caregiver to release the buckle when necessary. In addition to arthritis, other circumstances may arise where caregivers lack sufficient hand strength, including carpel tunnel syndrome, tendonitis, and chronic or temporary conditions or injuries.

The existing prior art in U.S. Pat. No. 8,539,862, which is incorporated herein by reference, seeks to address many of the foregoing difficulties. However, for those with arthritis in their hands and fingers, gripping edges of the housing element is difficult or painful, resulting in an inadequate ability to exert the required pressure to release the buckle. Additionally, the prior art lacks a backing to support the intended use, resulting in the need to position a free hand without guidance, or to push hard against the occupant of the car seat and apply uncomfortable pressure. The prior art offers no method for reducing or otherwise alleviating the amount of force required by the user to release the buckle.

Other attempts at addressing the difficulties described above include the use of pliers to depress the button and release the buckle from the latched condition. For example, a pair of standard pliers may be modified to have a protrusion on an end thereof to allow the protrusion to press the release button when the pliers are closed. However, this solution does not address the difficulty experienced by users with arthritis and other hand ailments. Oftentimes, users with arthritis have a difficult time using scissors or pliers due to the manual dexterity required. Therefore, a solution is needed that allows the button to be depressed in a method that requires minimal thumb or finger strength.

In another prior art attempt to address the difficulties described above, a lever arm is attached to the seat belt below the buckle. The lever arm has a protrusion thereon so that when force is applied to an opposite end of the lever, the protrusion depresses the button. While this solution allows pressure to be applied using the palm of the hand, rather than relying on individual finger strength, it requires a user to apply pressure straight into the buckle. This is often difficult to accomplish because the parent or guardian is normally reaching in from the side of the car seat when trying to unbuckle the occupant. One additional drawback of this type of lever arm is that it requires the device to be affixed to the strap of the car seat as a source of leverage, which poses a safety risk if a child learns to use the device to release the latch, but lacks the maturity to know when it is safe to do so.

By remaining affixed to the car seat, the device has the potential to enable a child to release the latch while the car is in motion.

SUMMARY OF THE INVENTION

The buckle release assistive device of the present invention seeks to overcome the prior art by addressing these considerations with a unique design that was developed by an occupational therapist specializing in hand therapy with expertise in designing rehabilitative solutions for activities required in daily life. Unique features of the design, which distinguish it from the prior art, may include, among other features, the use of a lever arm to reduce pressure required to push the device, no longer requiring dependency on the fingers for gripping the buckle, and the ability to use the device from a side of the occupant for expedient release of the buckle and emergent removal of the occupant from under the restraints.

The present apparatus for assisted buckle release has been devised to provide facility in depressing the actuator button of a car seat restraint harness to expediently effect release of the buckle from its locking engagement of the car seat restraint harness in a less painful and more convenient manner than through pressing the actuator button directly. The present method is applicable to a variety of automotive vehicle occupant restraint systems including, but not limited to, child car seat restraint systems.

It is another objective of the present method to alleviate hand or finger pain caused by repetitive motion in depressing the pre-existing actuator button of vehicle occupant restraint systems including, but not limited to, child car seat restraint systems.

Yet another objective of the present method is to provide a useful and safe means for individuals with chronic hand pain or limited hand function to use a standard vehicle occupant restraint systems including, but not limited to, child car seat restraint systems. The present apparatus and method for assisted buckle release, therefore, employs use of a buckle release assistive device which is specifically adapted to facilitate depression of the buckle release button devised to release the restraining belts interconnected therewith. As outlined above, many car restraints operable upon car seats, for example, employ a buckle connection that is releasable via depression of an out-facing button disposed thereupon.

The present apparatus increases the facility of disconnecting the restraints by presenting a first and a second wing, conformed ergonomically to the hand of a user, anteriorly projected from a midportion, whereby compression of the said first and second wings together is ergonomically facilitated between the user's thumb and fingers, for example, or between the user's thenar and fingers. A protuberance, projected intermedially from one of the said wings, is aligned with and then forced against the release button by compression of the first and second wing together. Depressing the release button, and releasing the restraints from the buckle, is therefore rendered easier for the user, due to the increased torque and pressure applied through the protuberance to effectuate depression of the button and removal of the restrains may be effectuated more quickly. This, therefore, facilitates release of the restraints with less force and discomfort required of the user.

For users who suffer from reduced ability to actually grasp the first and second wing, the present apparatus may further include an arcuate body disposed arched overtop the first wing to enable engagement overtop the dorsal of the user's hand. The arcuate body therefore enables a user to slide a hand between an undersurface of the arcuate body and an outer surface of the first wing whereby the arcuate body engages against the dorsal of the user's hand. The apparatus is thereby securable to the user's hand for use depressing the release button without the user having to actually grasp the apparatus is and effectuate manual compression of the first and second wings together. Secured to the hand, a user may simply press via the palm and effectuate release of the buckle.

In at least one example embodiment, the arcuate body is attached to the first wing at both ends. In another example embodiment, only one end of the arcuate body is attached, or attachable, to the first wing proximal to a terminus thereof.

The aforementioned broadly outlines the more important features of the present apparatus for assisted buckle release, where the detailed description thereof that follows may be better understood and in order that the present contribution to the art may be better appreciated.

Other objectives and advantages of the present apparatus for assisted buckle release will become apparent to those skilled in the art as a more detailed explanation of the invention is presented below. The drawings disclose a buckle release assistive device, according to one possible embodiment, devised for employing the present method of assisted buckle release. The above summary of the invention is not intended to represent each embodiment or every aspect of the present invention. Particular embodiments may include one, some, or none of the listed advantages.

BRIEF DESCRIPTION OF THE DRAWINGS FIGURES

A more complete understanding of the method and apparatus of the present invention may be obtained by reference to the following Detailed Description when taken in conjunction with the accompanying Drawings wherein.

Figure 9A:
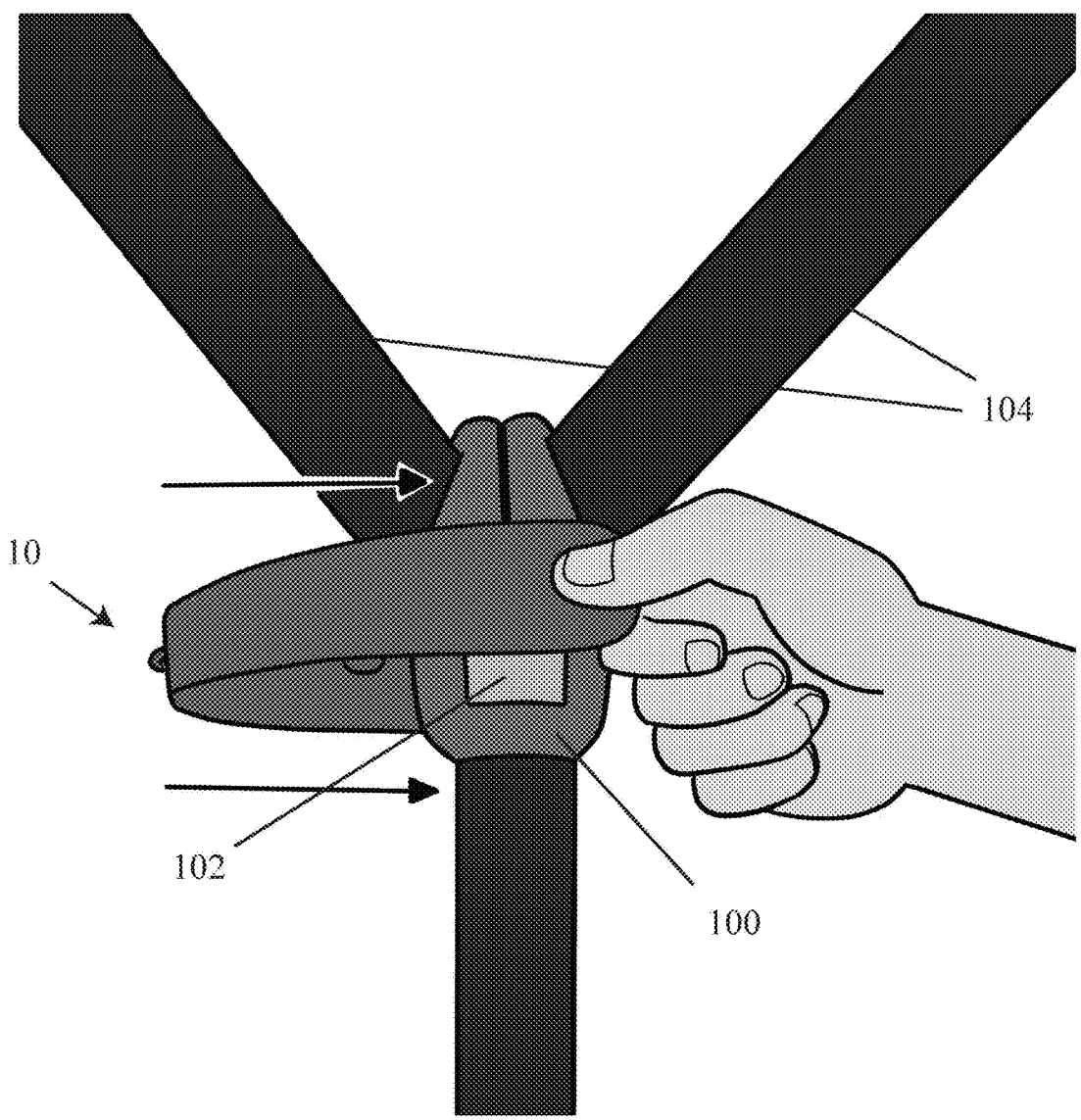
Figure 9B:
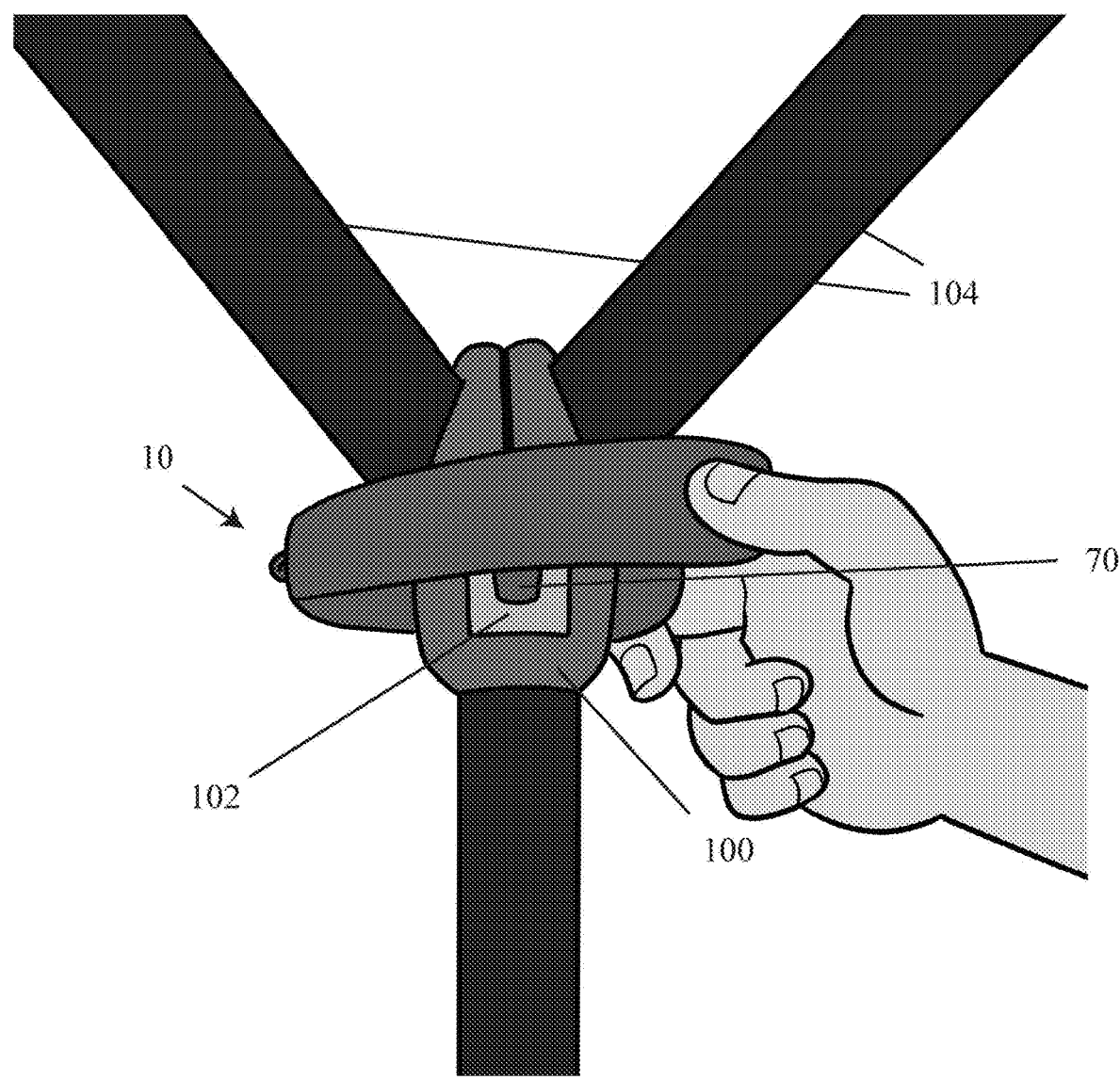
Figure 9C:
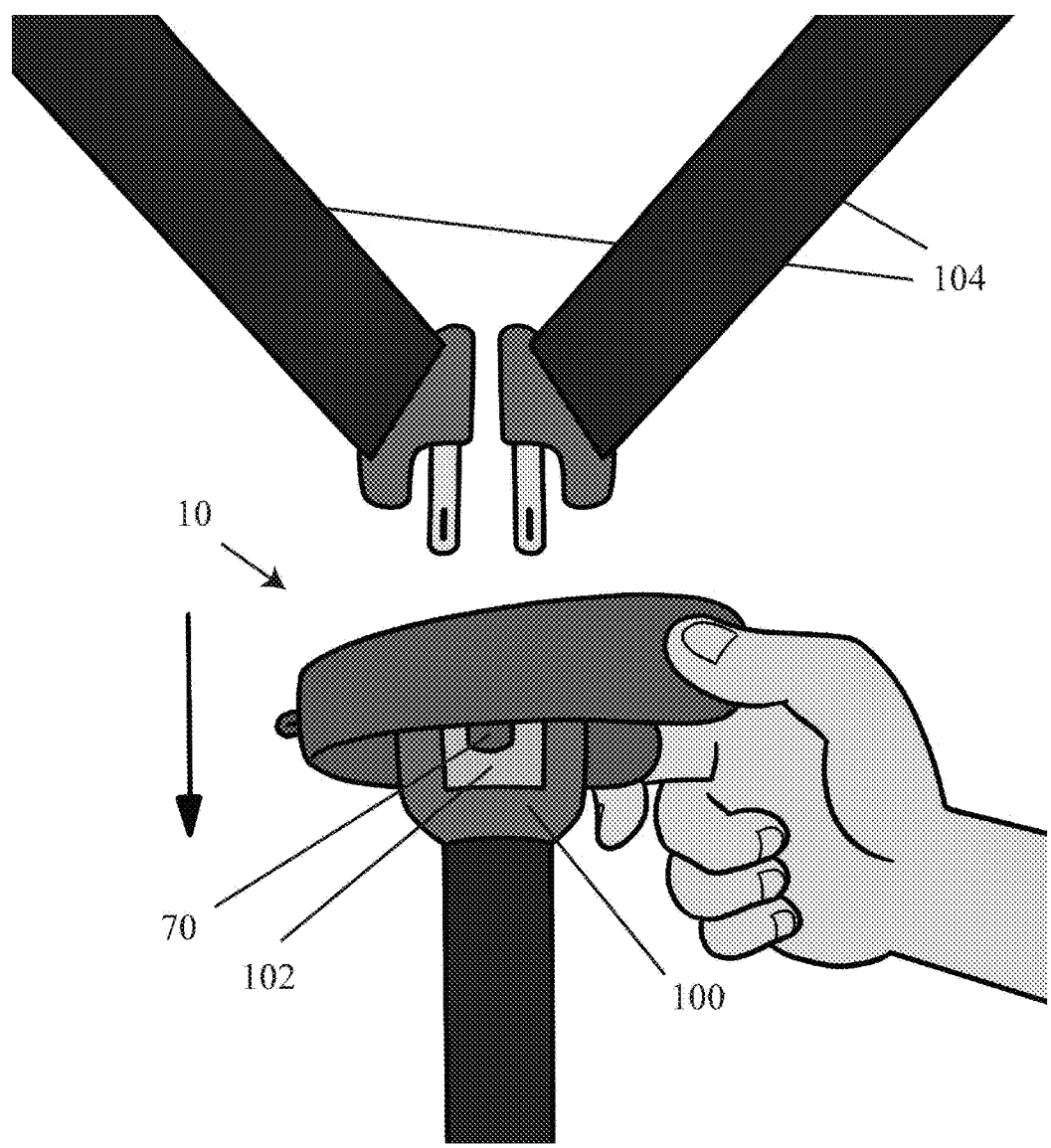
Figure 10:
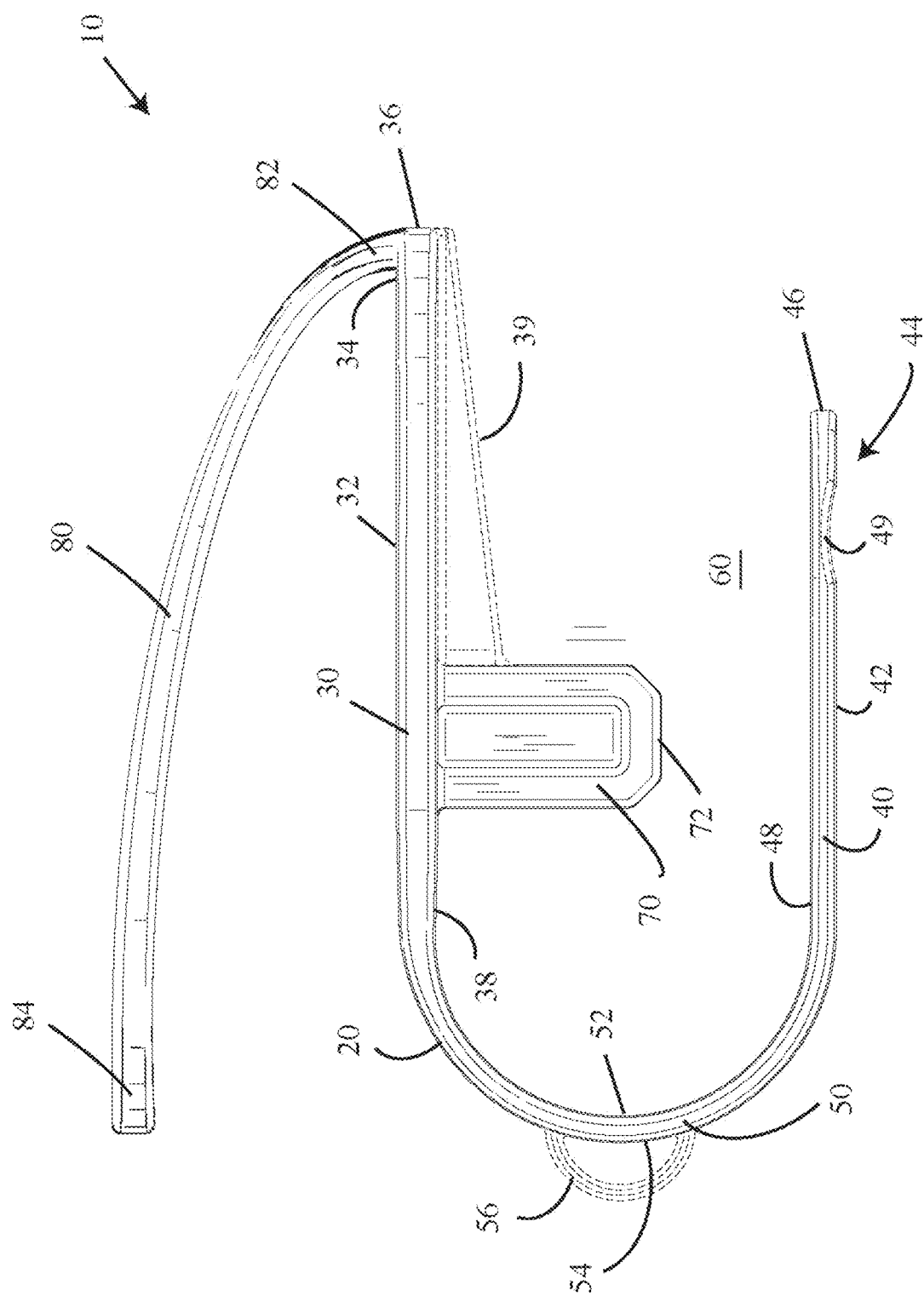
Figure 11:
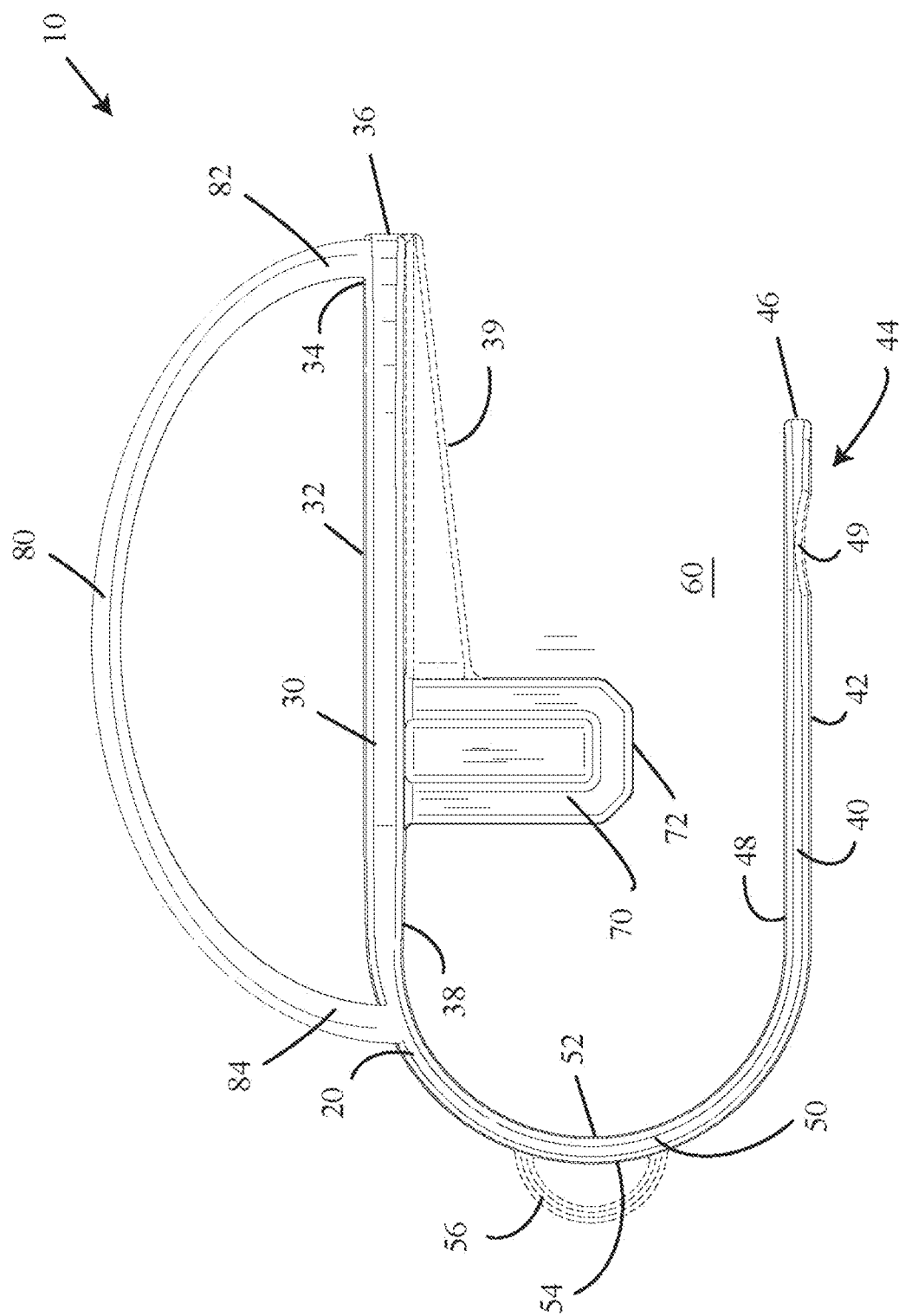

FIGS. 9a, 9b, and 9c, illustrate an exemplary, in-use view of an example embodiment of the buckle release assistive device employing the present method of buckle release disclosed herein;

FIG. 10 is a side elevation view of an example embodiment of the buckle release assistive device having an arcuate body attached to the first wing to enable engagement of the device to the dorsal of a user's hand; and FIG. 11 is a side elevation view of an example embodiment of the buckle release assistive device having an arcuate body attached to the first wing to enable engagement of the device to the dorsal of the user's hand.

DETAILED DESCRIPTION OF THE DRAWINGS

Figure 1:
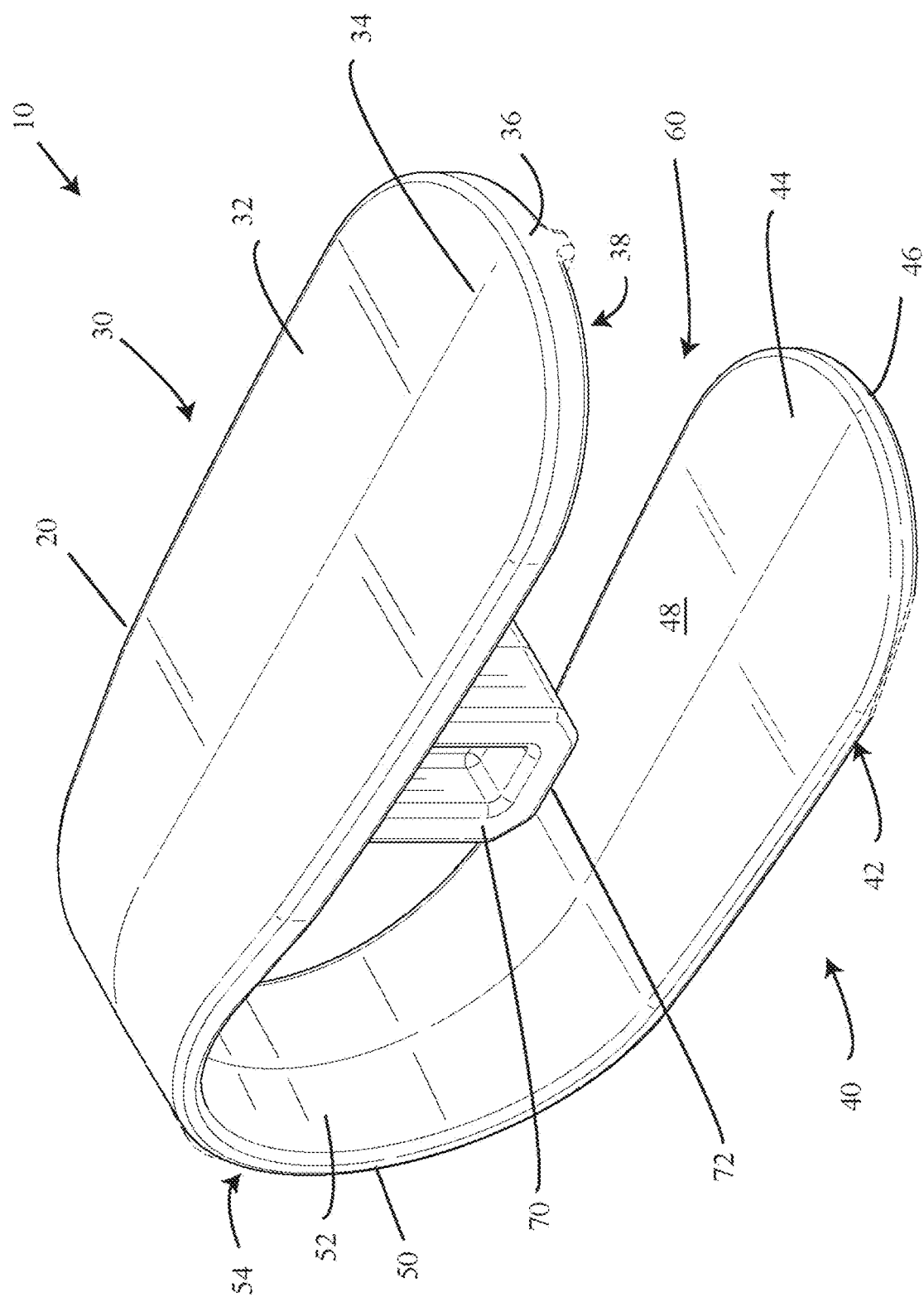
FIG. 1 is a perspective view of a buckle release assistive device according to an example embodiment of the present invention.

Referring to FIG. 1, the buckle release assistive device 10 contemplated for use with the present method herein disclosed includes a substantially C-shaped or U-shaped body 20 having a first wing 30 and a second wing 40 disposed spaced apart and projected anteriorly from a mid-portion 50. The first wing 30 and the second wing 40 therefore occupy parallel planes to delimit an intermediate space 60 therebetween.

The first wing 30 is disposed to position overtop the front of the buckle 100 to which the device 10 is applied and the second wing 40 is disposed to position overtop the rear of the buckle 100 to which the device 10 is applied. Thus the device 10 is fittable around a buckle 100 to position the buckle 100 interior to the intermediate space 60.

Figure 4:
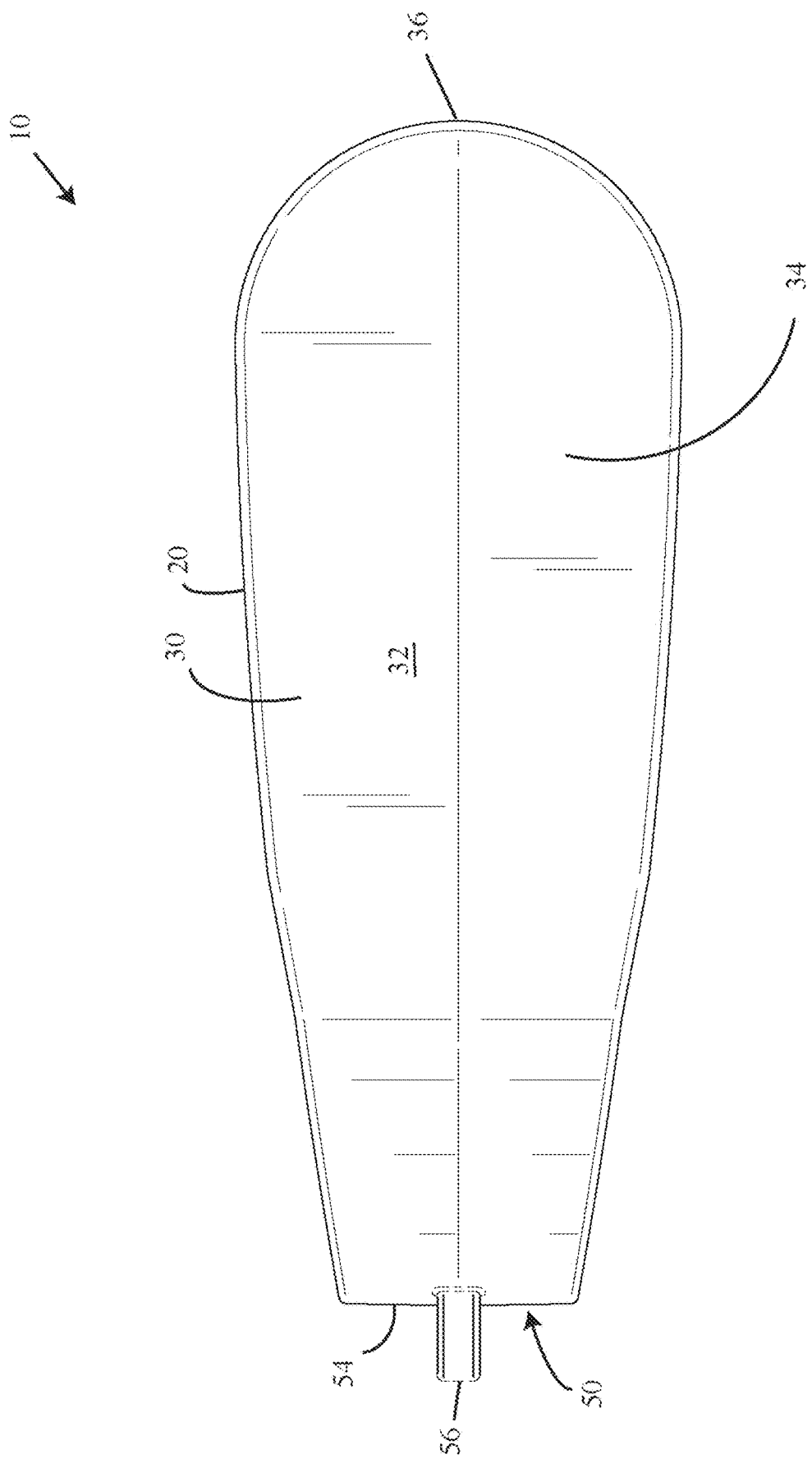
FIG. 4 is a top elevation view of an example embodiment of the buckle release assistive device.

The first wing 30 includes an outer surface 32 extensive from the mid-portion 50 to a terminus 34. As best shown in FIGS. 1 and 4, the outer surface 32 widens towards apical edge 36 disposed at the terminus 34 at a farthest extremity from the mid-portion 50. The outer surface 32 therefore presents an area for contact with the hand of a user and presents a flat surface for engagement therewith. In some embodiments, the outer surface may be overlain with a polymeric overmold, devised to be accommodating and yielding to the touch. In the example embodiment depicted, and best shown in FIG. 4, the apical edge 36 is rounded to prevent harmful contact or discomfort in use.

Figure 2:
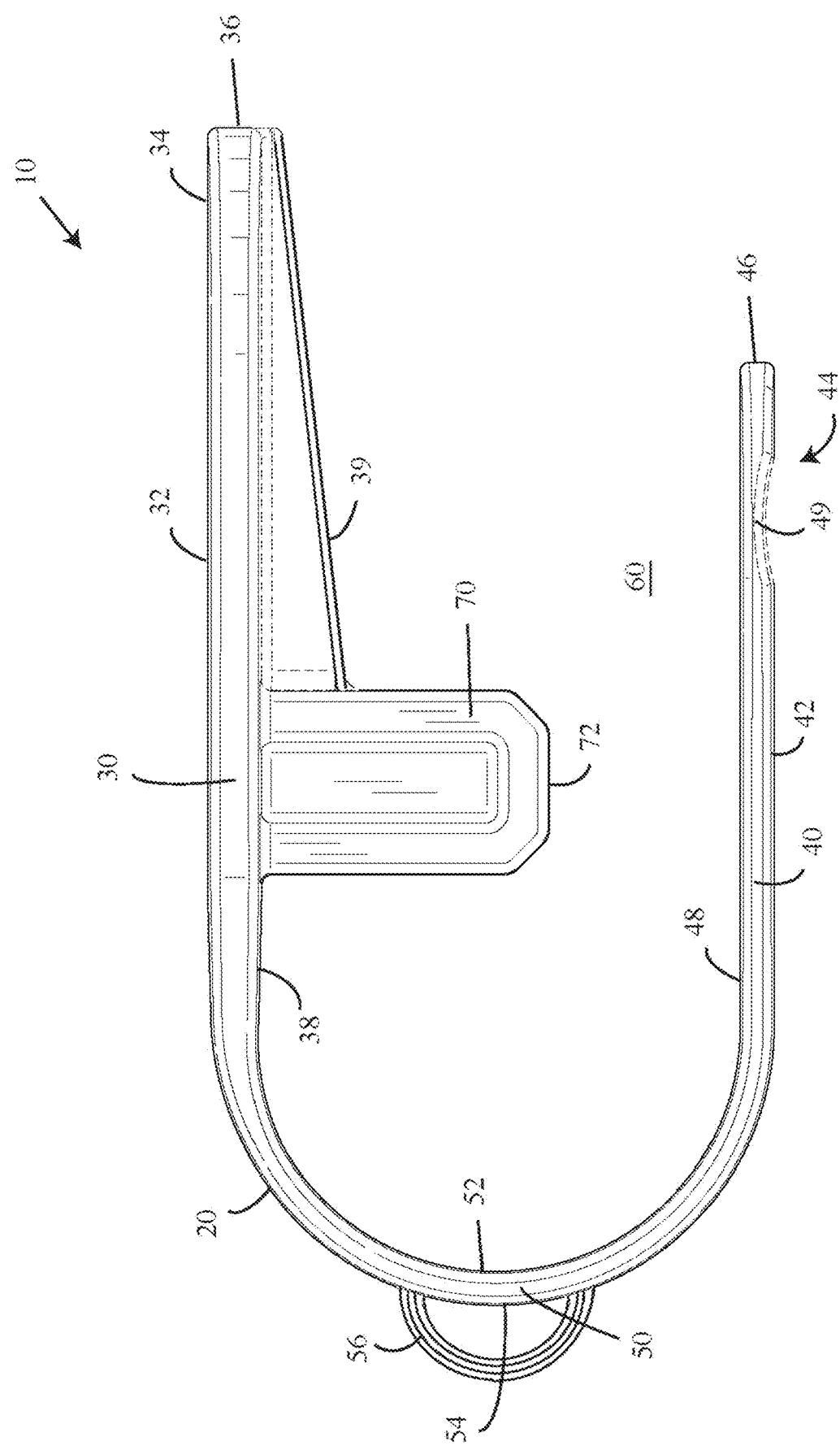
FIG. 2 is a side elevation view of an example embodiment of the buckle release assistive device.
Figure 3:
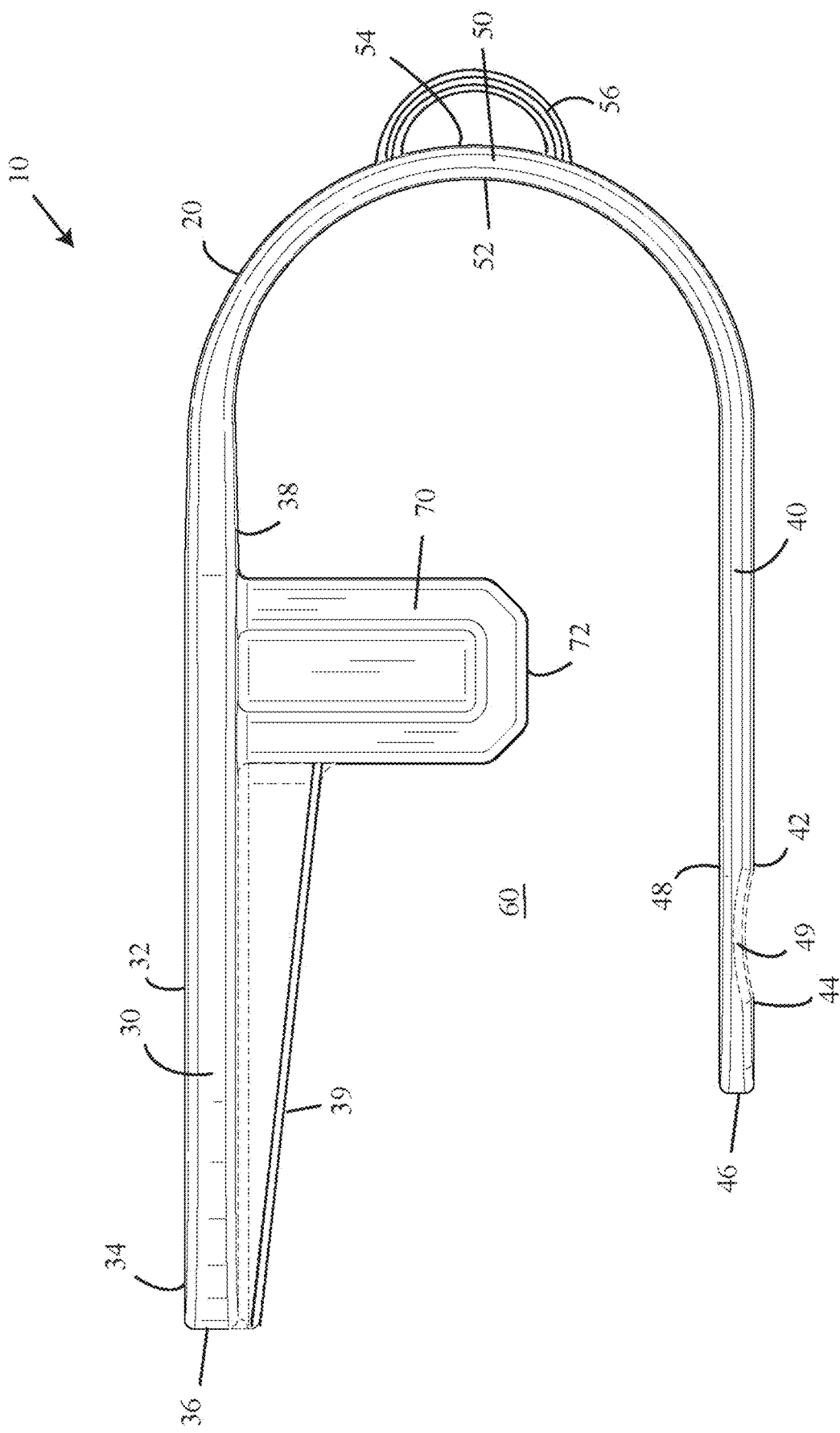
FIG. 3 is a side elevation view of an example embodiment of the buckle release assistive device.

In some embodiments, and as best shown in FIGS. 2 and 3, the first wing 30 may also include a sloped member 39 disposed longitudinally upon the inner surface 38 thereof, between the apical edge 36 and the protuberance 70. The sloped member 39 may assist in fitting the assistive device 10 around the buckle 100, by siding engagement against the buckle 100 as the assistive device 10 is oriented into position, whereby the buckle 10 is forced to position in the intermediate space 60 with the buckle's release button 102 positioned directly situated underneath the protuberance 70 at the end of the sloped member 39. The sloped member 39 may further act to strengthen the protuberance 70, to stabilize the protuberance 70, and prevent breakage thereof during use.

Figure 5:
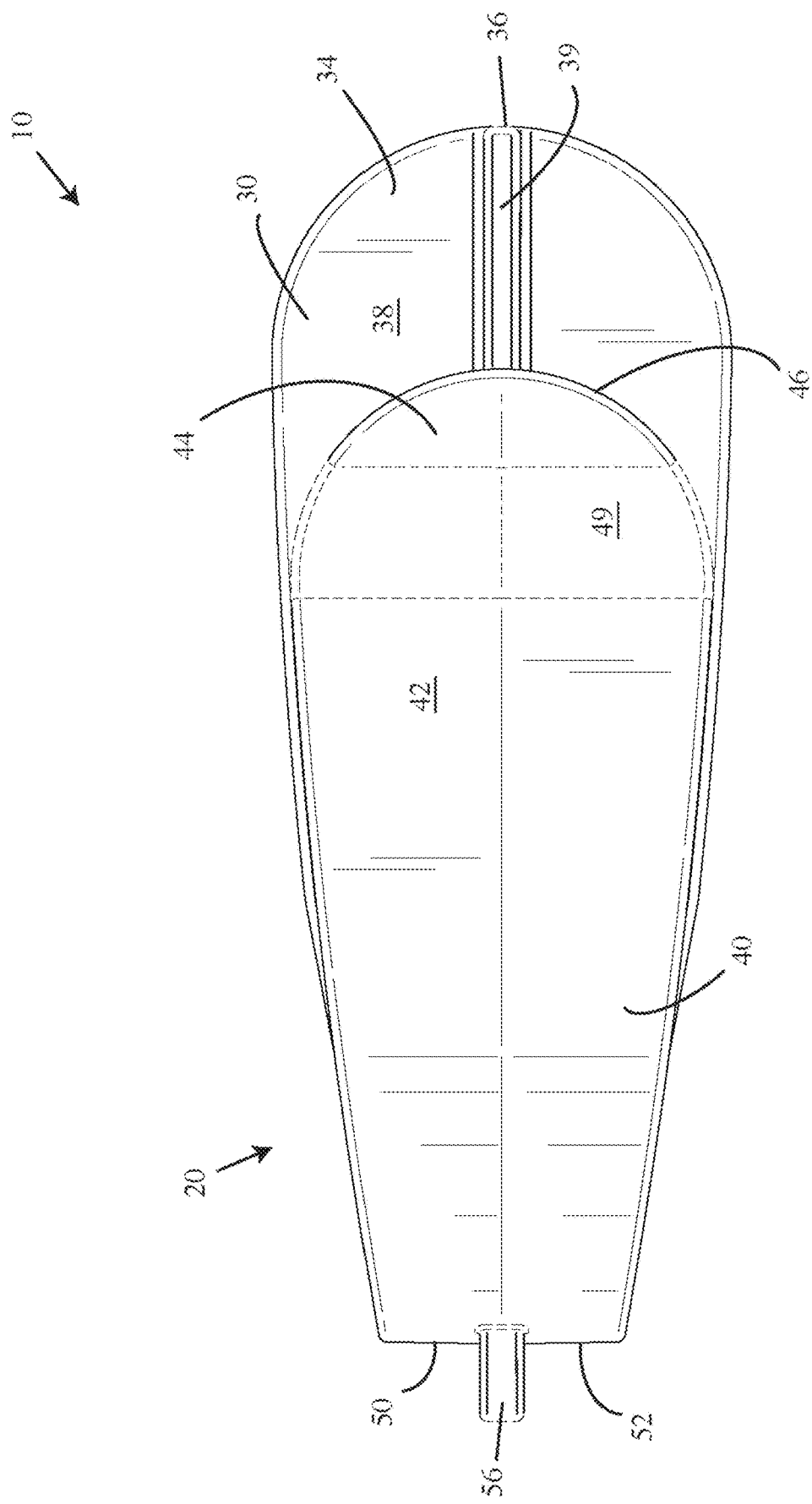
FIG. 5 is a bottom elevation view of an example embodiment of the buckle release assistive.
Figure 6:
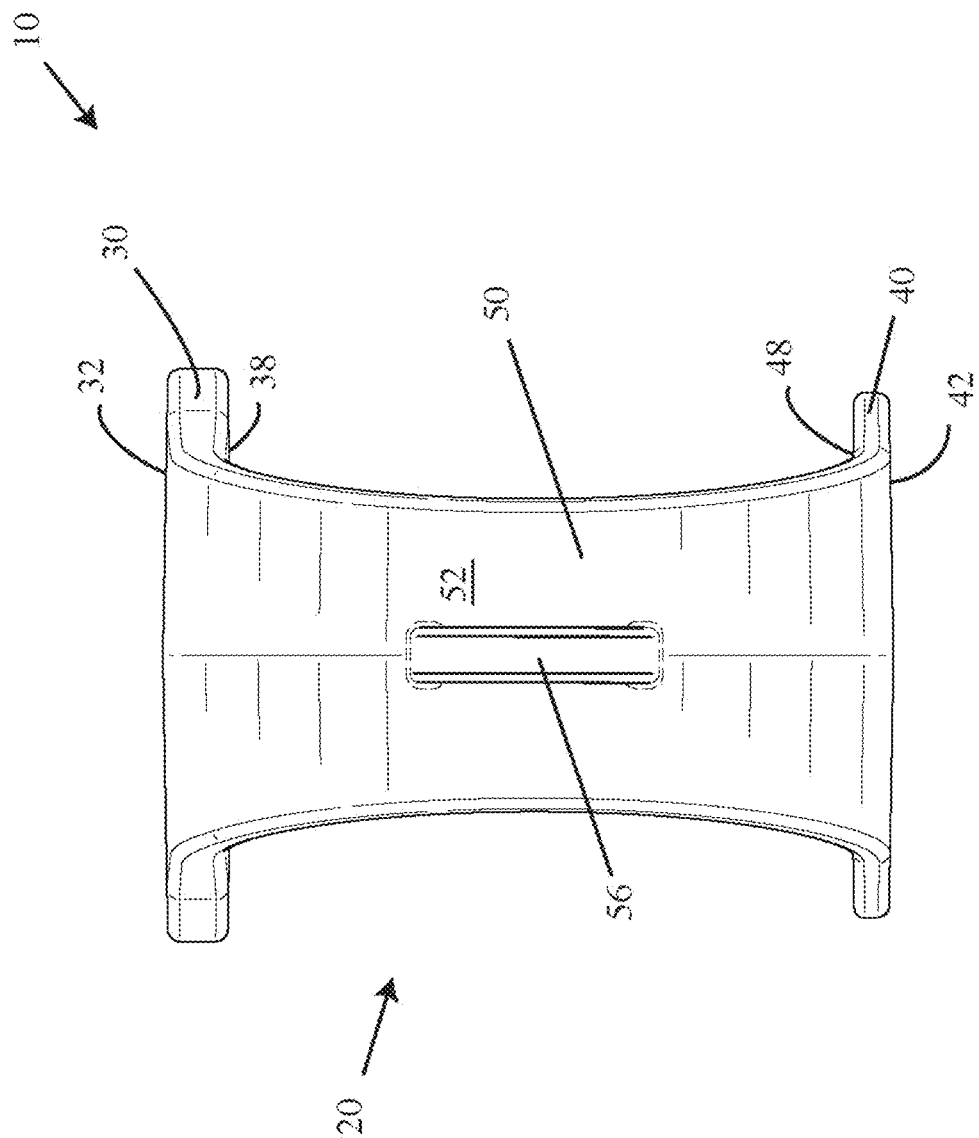
FIG. 6 is a rear elevation view of an example embodiment of the buckle release assistive device.
Figure 7:
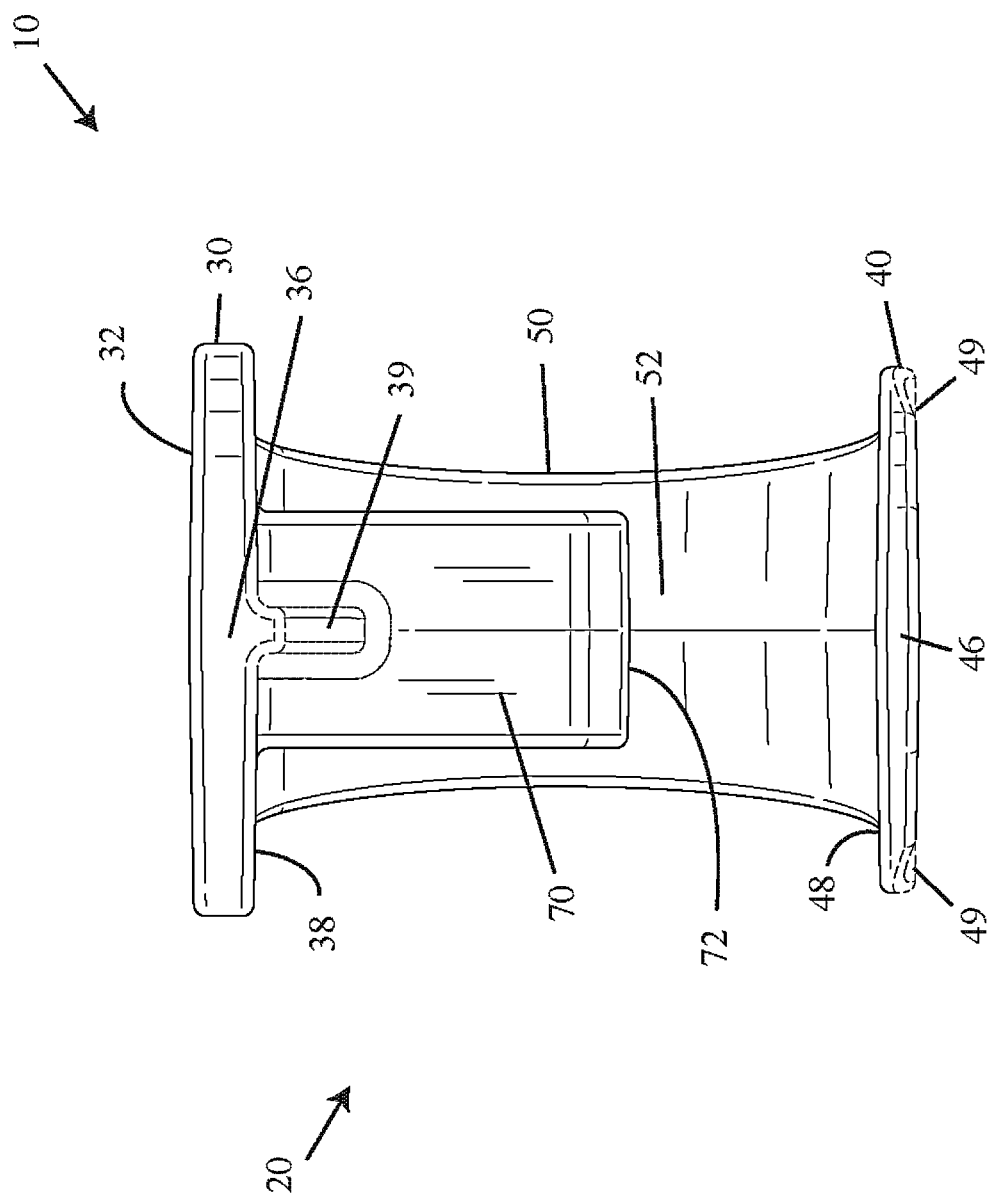
FIG. 7 is a front elevation view of an example embodiment of the buckle release assistive device.

The second wing 40 also includes an outer surface 42 extensive from the mid-portion 50 to terminus 44. As best shown in FIG. 5, the outer surface 42 widens toward apical edge 46 disposed at the terminus 44 at a farthest extremity from the mid-portion 50. In some embodiments, the outer surface may be overlain with a polymeric overmold, devised to be accommodating and yielding to the touch. In the example embodiment depicted herein, while maintaining a similar width relative to and coextensive with the first wing 30, the second wing 40 has a longitudinal axis that is shorter than the longitudinal axis of the first wing 30. Thus, as best shown in FIG. 5, the first wing 30 extends its apical edge 36 farther from the mid-portion 50 than the second wing 40 and therefore overhangs the second wing 40 some distance. In the example embodiment depicted, and best shown in FIG. 5, the apical edge 46 is also rounded to prevent harmful contact of discomfort when in use.

As is best shown in FIG. 3, outer surface 42 of the second wing 40 may include transverse recess 49 disposed at terminus 44, said transverse recess 49 adapted to accommodate the intermediate phalanx of the user's forefinger when engaging the buckle release assistive device 10, as will be explained forthwith. (See for example FIGS. 9a-9c.)

The first wing 30 further includes an inner surface 38, disposed facing the second wing 40 on one side of the intermediate space 60. Likewise, the second wing 40 includes an inner surface 48, disposed facing the first wing 30 on the other side of the intermediate space 60. In the embodiment exemplified herein, a protuberance 70 is disposed projecting from the inner surface 38 of the first wing 30 into the intermediate space 60. The protuberance 70 includes an actuator surface 72 devised to seat against a button 102 of buckle 100, said actuator surface 72 sized appropriate therefor. The actuator surface 72 may include tractive members or other coating and/or surface features devised to increase friction against the button 102 to which the buckle release assistive device 10 is engaged.

As best shown in FIG. 2, the protuberance 70 may be disposed medially along the length of the first wing 30. The distance between the protuberance 70 and the apical edge of the first wing 30 therefore represents a lever arm distance which increases torque when applying pressure to the button 102 to which the buckle release assistive device 10 is engaged. The surface area of each of the wings 30, 40 relative the surface area of the actuator surface 72 of the protuberance 70 creates a pressure differential wherein a force manually applied to the pair of wings 30, 40 is increased by distribution through the lesser surface area exhibited at the actuator surface 72, thus increasing efficacy in depressing an associated actuator button 102 underlying the actuator surface 72 of the protuberance 70. Thus, the device and method is operable as an assistive buckle release due to lever arm distance (increased torque) as well as pressure.

It should be noted, therefore, that the present method is employable with similar assistive devices (not shown) that orient the protuberance 70 at different locations along the length of the first wing 30, including embodiments that have the protuberance 70 at the terminus 34 of the first wing 30, say, or rendered as a projection disposed toward the second wing 40 from the apical edge 36 of the terminus 34, the main utility of the present method residing in the ability to depress button 102 indirectly and by action of the assistive device 10 disposed engaged around the buckle 100 proper, rather than any appreciable increase or decrease in action enabled by an associated lever arm distance. Since force is more easily applied by a user in contracting the hand generally, by leveraging the anatomy of the hand and its musculature between opposing digits, such as the thumb and forefinger, or thenar and fingers, for example, as opposed to depressing with a single digit such as a finger or thumb in a single direction, the actual position of the protuberance 70 upon the inner surface 38 of the first wing 30 is of lesser consequence than the position of each of the first and second wings 30, 40 occupying planes defining an intermediate space 60 adapted to accommodate the buckle 100 therein. The expanse of the upper surfaces 32, 42 likewise increases facility in employment of the present method. Thus, the assistive device 10 enables greater facility in effectuating release of a buckle 100 by increased torque, pressure, and manual engagement accommodative of the physical anatomy of the hand in general.

Mid-portion 50 is devised to be to enable compression of the first wing 30 and the second wing 40 together. Thus, the present buckle release assistive device 10 may be readily positioned with the first and second wing 30, 40 disposed on either side of the buckle 100. The distance between inner side 54 of mid-portion 50 and the protuberance 70 may be matched to the dimensions of the buckle 100 whereby the protuberance 70 is maintained directly overtop the button 102 when the buckle 100 abuts the inner side 54. A simple squeeze by the user then effects depression of the button 102 and release of the restraints 104.

In the example embodiment depicted herein, attachment member 56 is disposed upon an outer side 54 of the mid-portion 50 to enable interconnection with a key ring, or example, or another article, item, or accouterment, suited for porting or storing the present device 10.

Figure 8:
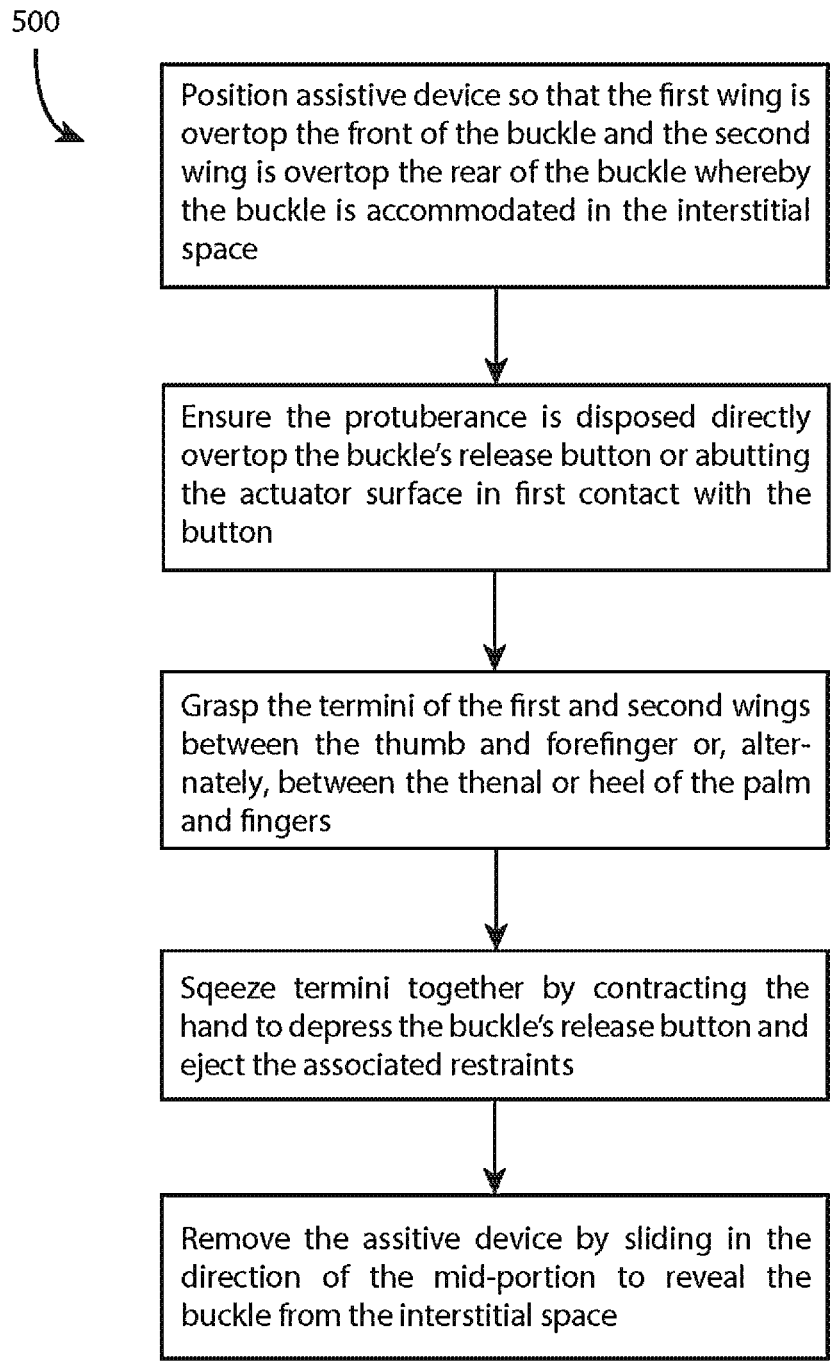
FIG. 8 is a flow chart illustrating an exemplary method of using an embodiment of the buckle release assistive device.

FIG. 8 depicts a flow chart illustrating the steps of the present method 500 employed when using the instant device. A user first places the assistive device around a buckle, to engage the buckle interior to the intermediate space. Once positioned so that the protuberance is disposed directly overtop the buckle release button, the user grasps termini and squeezes together. The actuator surface of the protuberance therefore engages against the button and depresses it effectuating the release of tongues of the restraint belts. The buckle release assistive device may then be disengaged from around the buckle by sliding in the direction of the mid-portion and thence stored as desired.

FIGS. 9a, 9b, and 9c, illustrate an in-use view of the present device 10 used to disengage restraints 104 from a buckle 100 by facilitating depression of a release button 70.

FIG. 10 illustrates a side elevation view of an example embodiment having an arcuate body 80 disposed attachable proximal the terminus 34 of the first wing 30. The arcuate body 80 includes a first end 82 and a second end 84. The arcuate body 80 may be attachable to the first wing 30 by sliding engagement of the first end 82 to nest to in securement with the first wing 30 proximal the terminus 34. Alternatively, the arcuate body 80 may be connected to the first wing 30 proximal the terminus 34. The arcuate body 80 is disposed to accommodate the dorsal of a user's hand underneath, may comprise a yielding polymeric or other material configured for ergonomic and comfortable contact with the user's hand, said arcuate body 80 thereby engaging against the dorsal of the user's hand to assist in securing the device 10 in contact with the user's hand.

Users who are unable to sufficiently grasp the device 10 to manually effectuate compressing the first and the second wing 30, 40 together with ease are therefore enabled to slide a hand under the arcuate body 80 and thence effectuate operation of the device 10 by pressing the palm of the hand engaged under the arcuate body 80 to compress the first wing 30 and thus effectuate release of the restraints.

FIG. 11 illustrates a side elevation view of an example embodiment of the invention 10 having an arcuate body 80 as disclosed in FIG. 10, but with both ends 82, 84 attachable or attached to the first wing 30. A user is thus enabled to slide a hand underneath the arcuate body 80, as described above, to engage the arcuate body 80 to the user's dorsal and effectuate compression of the first wing 30 to depress the release button 102 without having to manually grasp the device 10 and squeeze the first and second wing 30, 40 together.

What is claimed is:

1. An apparatus for assisted buckle release comprising:
    a planar first wing projected anteriorly from one end of the mid-portion, said first wing comprising:
        an outer surface configured for ergonomic contact with the hand of a user along a portion of its length;
        an inner surface;
        a terminus terminating the first wing distally disposed relative to the mid-portion;
        an apical edge disposed endwise upon the terminus;
    a planar second wing projected anteriorly from the other end of the mid-portion, said second wing comprising:
        an outer surface configured for ergonomic contact with the hand of a user along a portion its length;
        an inner surface disposed facing the inner surface of the first wing;
        a terminus terminating the second wing distally disposed relative to the mid-portion;
    a protuberance disposed projected from the inner surface of the first wing and not from the outer surface of the first wing; and
    an intermediate space disposed between the inner surface of each of the first and second wings, said intermediate space sufficient to accommodate an existing buckle to position the protuberance in proximal contact with a release button effectuating release of the buckle;
    wherein the apparatus surrounds at least three sides of the buckle through at least 270 degrees;
    wherein the device is fittable around the existing buckle to effectuate depression of the release button when the first wing and the second wing are manually compressed towards each other.

2. The apparatus for assisted buckle release of claim 1 wherein the first wing and the second wing do not extend posteriorly substantially beyond the mid-portion.

3. The apparatus for assisted buckle release of claim 2 wherein the first wing and the second wing do not extend posteriorly beyond the mid-portion.

4. The apparatus for assisted buckle release of claim 1 wherein the apical edge of each terminus is rounded to prevent harmful contact.

5. The apparatus for assisted buckle release of claim 1 further comprising a handle member connectable to the first wing, said handle member comprising:
    a first end connectable to the first wing proximal the terminus;
    an arcuate body disposed arched overtop the first wing, said arcuate body disposed to engage around a dorsal of a user's hand grasping the first wing; and
    a second end;
    wherein the dorsal of the user's hand is engaged under the arcuate body to maintain position of the apparatus in manual contact with the user whereby the apparatus is usable by user's who otherwise would have difficulty grasping the apparatus.

6. The apparatus for assisted buckle release of claim 5 wherein the second end of the arcuate body is connectable to the first wing proximal the midportion.

* * * * *